(12) United States Patent
Kim

(10) Patent No.: US 6,783,664 B2
(45) Date of Patent: Aug. 31, 2004

(54) WATER-TREATING DEVICE

(76) Inventor: Hyun Jong Kim, 4595 Wilshire Blvd., #304, Los Angeles, CA (US) 90010

( * ) Notice: Subject to any disclaimer, the term of this patent is extended or adjusted under 35 U.S.C. 154(b) by 57 days.

(21) Appl. No.: 10/307,049

(22) Filed: Nov. 27, 2002

(65) Prior Publication Data

US 2004/0099585 A1 May 27, 2004

(51) Int. Cl.$^7$ .................................................. C02F 1/48
(52) U.S. Cl. ........................... 210/85; 210/94; 210/222; 210/223; 366/142
(58) Field of Search ............................ 210/85, 94, 222, 210/223, 695; 366/142

(56) References Cited

U.S. PATENT DOCUMENTS

| | | |
|---|---|---|
| 4,540,489 A | 9/1985 | Barnard ........................ 210/287 |
| 4,904,381 A | 2/1990 | Urakami ....................... 210/223 |
| 5,059,296 A | 10/1991 | Sherman |
| 5,628,900 A | 5/1997 | Naito ........................... 210/223 |
| 5,647,974 A * | 7/1997 | Shim et al. ................... 210/222 |
| 5,816,058 A | 10/1998 | Lee et al. ....................... 62/126 |
| 6,120,668 A | 9/2000 | Kim ............................ 204/664 |
| 6,171,490 B1 | 1/2001 | Kim ............................ 210/223 |

* cited by examiner

Primary Examiner—David A. Reifsnyder
(74) Attorney, Agent, or Firm—Park & Sutton LLP; John J. Park

(57) ABSTRACT

A water-treating device having a water jar, a magnetic agitator, an additive container having a bottom plate and a sleeve attached to the bottom plate, and an agitator driver that rotates the magnetic driver. The sleeve of the additive container has an outer wall, an inner wall, and mineral particles filled between the inner wall and the outer wall. The magnetic agitator has a base and a Y-shaped fin that protrudes upward from the base. The magnetic agitator has a magnetic bar between the fin and the base. The base has a shape of a disc having an upper surface and a lower surface, wherein the lower surface is convex. A metal plate is attached to the lower surface. The bottom plate also has a metal plate that contacts the metal plate of the base.

20 Claims, 5 Drawing Sheets

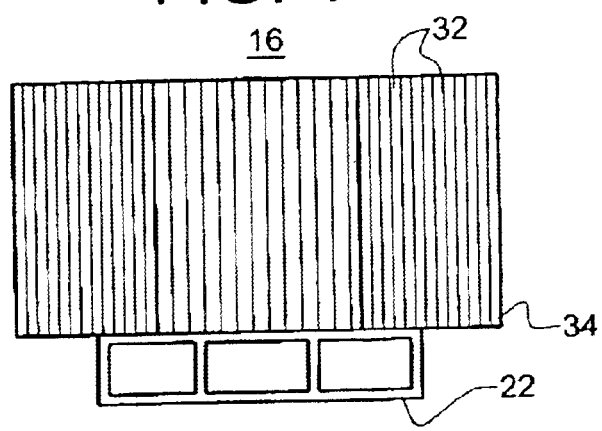
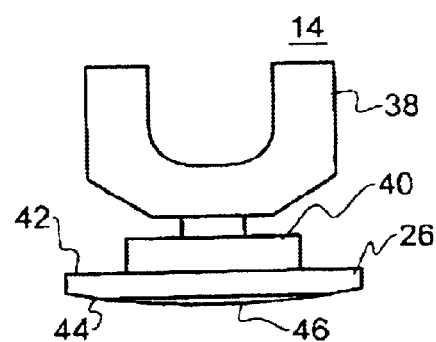
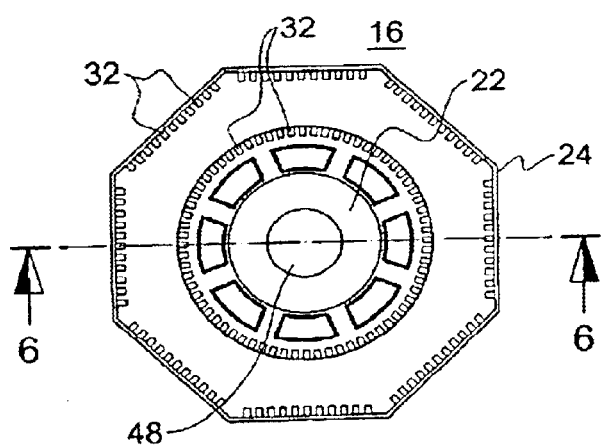
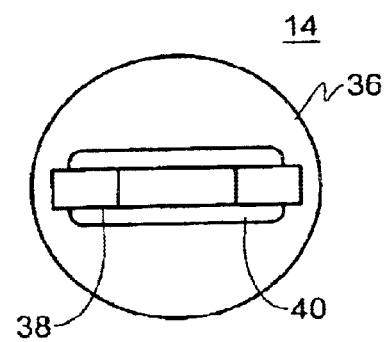
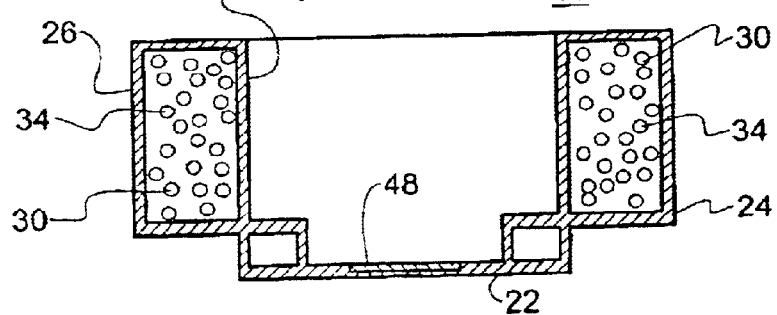

WATER-TREATING DEVICE

BACKGROUND OF THE INVENTION

The present invention relates to a water-treating device. More particularly, the invention relates to a water-treating device that magnetizes water and adds minerals to water by agitating water by magnet and creating water flow through a porous member that contains minerals.

There are many prior art water-treating devices that magnetize water or add minerals to water.

U.S. Pat. No. 5,816,058 to Lee et al. discloses a treating device that magnetizes water. Magnets adjacent a water container and a rotating magnet inside the container provides magnetic field to magnetize water. The device is adapted to be installed inside a refrigerator.

U.S. Pat. No. 5,628,900 to Naito discloses a water filter in which ceramic particles, magnetic pieces and annular magnets are embedded.

U.S. Pat. No. 5,059,296 to Sherman discloses a solar powered water purifier that releases metallic ions into water.

U.S. Pat. No. 4,904,381 to Urakami discloses a treating device that includes a spherical rotating body arranged in a fluid passage. The body includes magnets embedded in a predetermined way inside the body.

U.S. Pat. No. 4,540,489 to Urakami discloses a three-layer filter that includes a pre-filter, an activated carbon filter, and a ceramic micro screen.

U.S. Pat. No. 6,120,668 to Kim discloses a treating device for making hexagonal water, in which two cases arranged serially along water path imparts magnetization vertically and then horizontally.

U.S. Pat. No. 6,171,490 to Kim discloses a water purifier capable of magnetizing water and adding ceramic components into the magnetized water. The purifier includes a rotating permanent magnet and a ceramic filter.

SUMMARY OF THE INVENTION

The present invention contrives to improve efficiency of a water treating device.

An object of the invention is to provide a water-treating device that can agitate water more efficiently so that magnetization and mineral addition should be enhanced.

Another object of the invention is to provide a water-treating device that can drive a rotating magnet more powerfully.

Still another object of the invention is to provide a water-treating device that has a more durable rotating magnet.

To achieve the above-described objects, the invention provides a water-treating device. The water-treating device includes a water jar, a magnetic agitator, an additive container having a bottom plate and a sleeve attached to the bottom plate, and an agitator driver that rotates the magnetic agitator. The additive container is positioned inside the water jar and the magnetic agitator is positioned inside the additive container. The sleeve of the additive container has an outer wall and an inner wall. The inner wall has a circular shape, and the outer wall has a shape of an octagon. The additive container further includes mineral particles and bamboo charcoal particles that are filled between the inner wall and the outer wall. The mineral particles include coral calcium and mineral stone. The inner wall and the outer wall have a plurality of holes so that water can flow through the holes.

The magnetic agitator has a base and a fin that protrudes upward from the base. The fin is Y-shaped, and the base is positioned on the bottom plate, and rotated by the agitator driver.

The magnetic agitator further includes an agitator magnetic bar between the fin and the base, and the agitator magnetic bar is a permanent magnet.

The base of the magnetic agitator has a shape of a disc having an upper surface and a lower surface. The lower surface is convex. An agitator metal plate is attached to the lower surface and covers part of the lower surface.

Preferably, the agitator metal plate covers about two-thirds of the area of the lower surface.

The bottom plate has a bottom metal plate attached to the bottom plate. The agitator metal plate contacts the bottom metal plate.

The agitator driver has two driver magnets, and a motor for rotating the driver magnets about an axis of rotation. The driver magnets are positioned opposite about the axis of rotation.

The driver magnets and the agitator magnetic bar are arranged so that the north pole of one of the two driver magnets faces the south pole of the agitator magnetic bar, and the south pole of the other of the two driver magnets faces the north pole of the agitator magnetic bar.

Preferably, the agitator magnetic bar has magnetic field strength of about 5500 gauss, and each of the driver magnets has magnetic field strength of about 3500 gauss.

The water-treating device further comprises a display and a sound signal generator. The display and the sound signal generator may be used to show a visual change reminder and to give an audible alarm for replacing the additive container.

In an alternative embodiment, the fin of the magnetic agitator is made of a permanent magnet, rather than having a separate magnet bar.

The advantages of the present invention are numerous in that: (1) a stronger turbulent flow of water is generated to enhance magnetization of water and mineral addition; (2) a more durable agitator is provided; and (3) a more efficient driving mechanism for rotating an agitator is provided.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIG. 4 is an elevation view of an additive container;

FIG. 5 is a plan view of the additive container;

FIG. 6 is a cross-sectional view taken along line 6—6 in FIG. 5;

FIG. 7 is an elevation view of a magnetic agitator;

FIG. 8 is a plan view of the magnetic agitator;

DETAILED DESCRIPTION OF THE PREFERRED EMBODIMENTS

Figure 1:
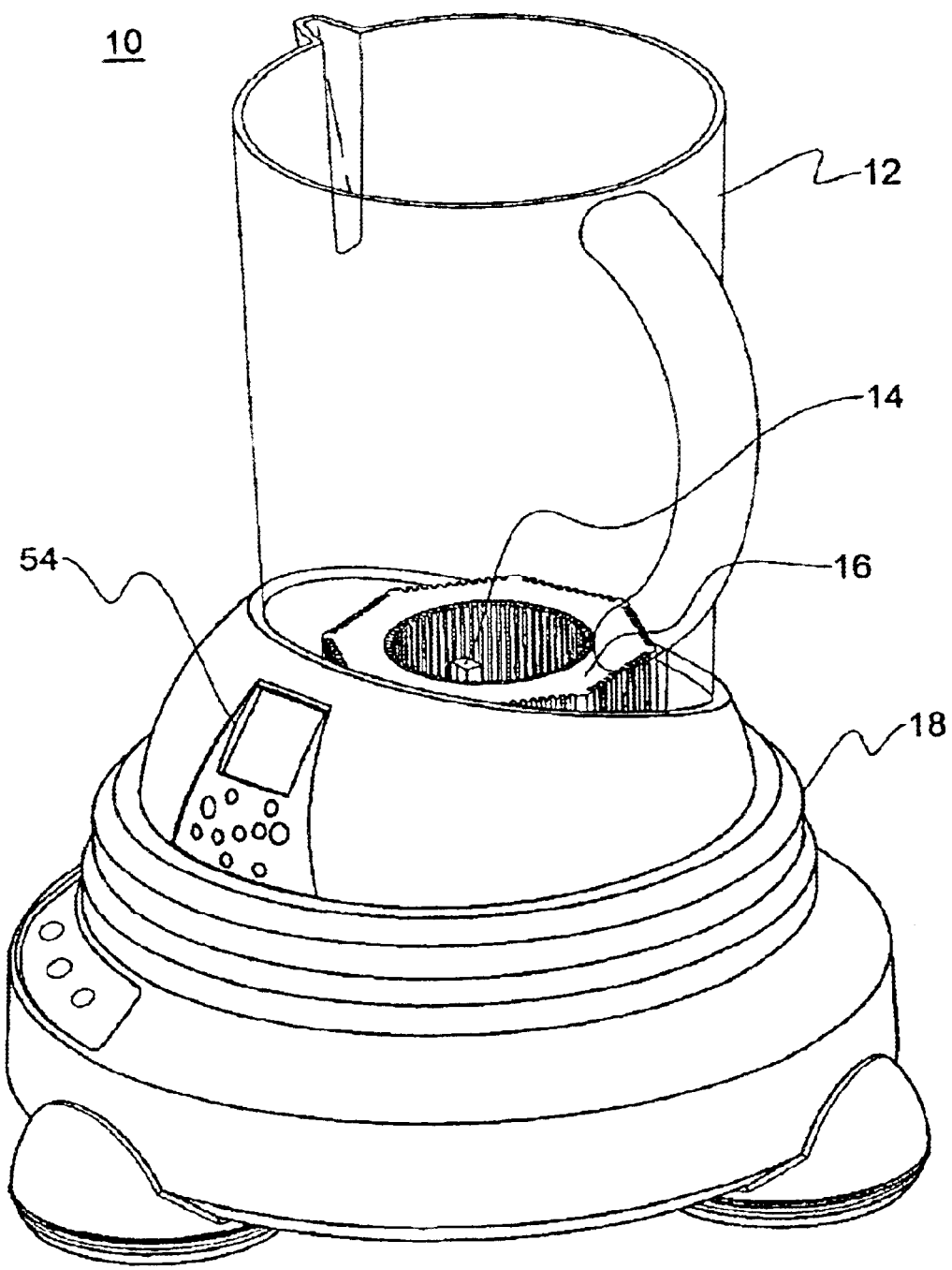
FIG. 1 is a perspective view of a water-treating device according to the present invention.
Figure 2:
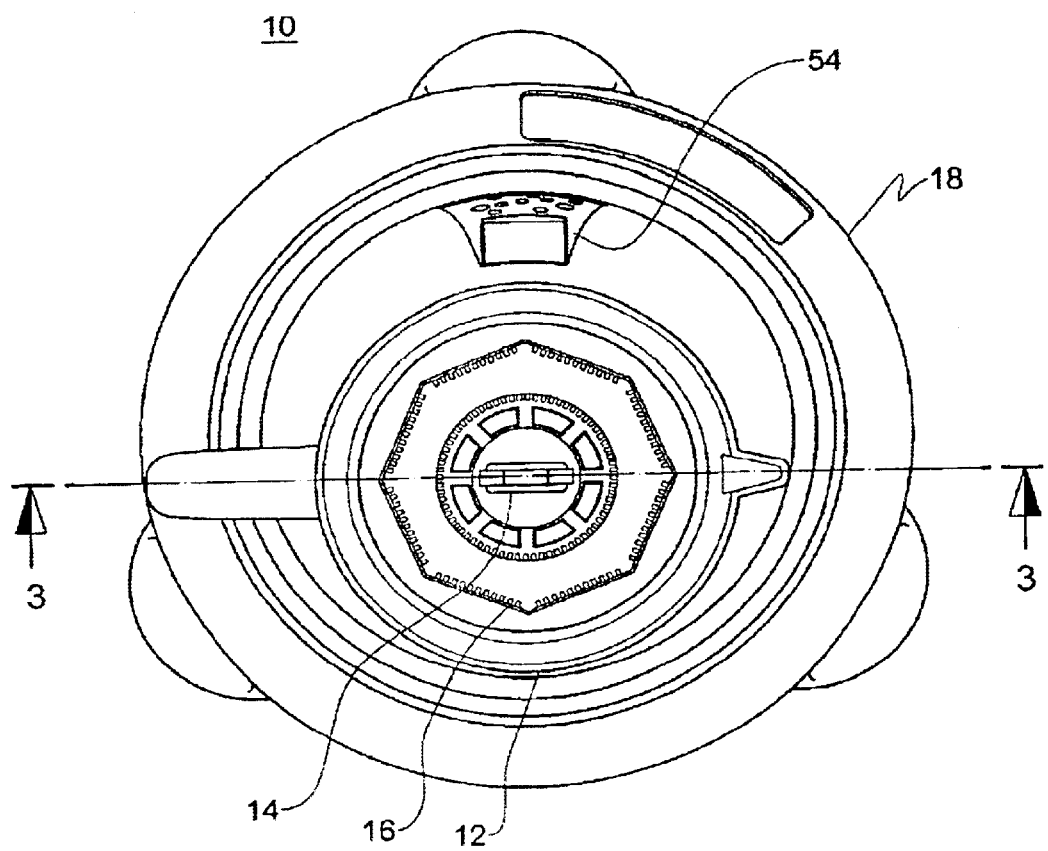
FIG. 2 is a plan view of the water-treating device.

FIGS. 1 and 2 show a water-treating device 10 according to the present invention. The water-treating device 10 includes a water jar 12, a magnetic agitator 14, an additive container 16 and a pedestal 18 on which the water jar 12 is placed.

Figure 3:
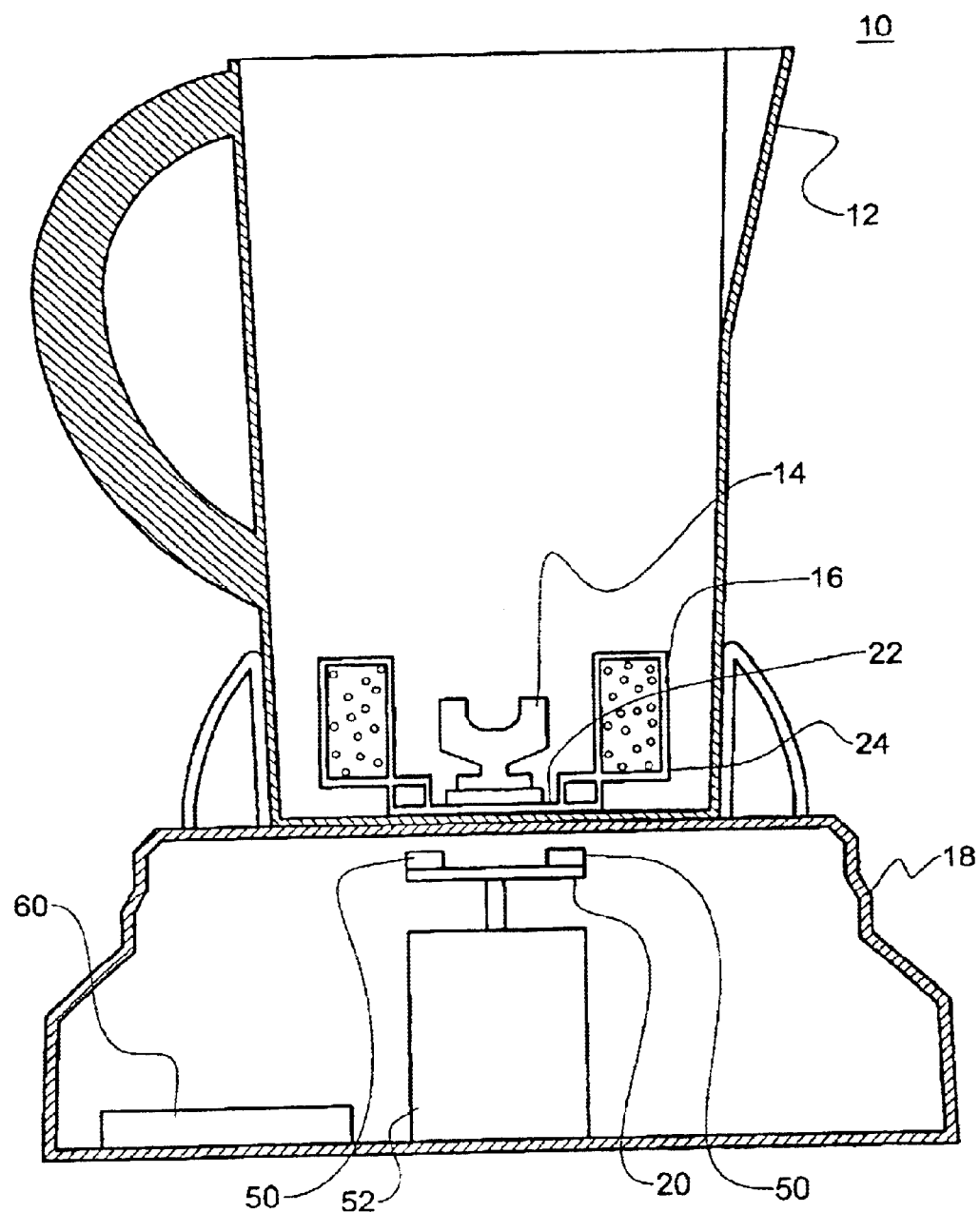
FIG. 3 is a cross-sectional view taken along line 3—3 in FIG. 2.

FIG. 3 shows an agitator driver 20 that rotates the magnetic agitator 14. The agitator driver 20 is provided inside the pedestal 18. The additive container 16 is positioned inside the water jar 12 and the magnetic agitator 14 is positioned inside the additive container 16. The additive container 16 having a bottom plate 22 and a sleeve 24 attached to the bottom plate 22. Specifically, the additive container 16 rests on the bottom of the water jar 12, and the magnetic agitator 14 rests on the bottom plate 22 of the additive container 16.

FIGS. 4–6 show the additive container 16. The sleeve 24 of the additive container 16 has an outer wall 26 and an inner wall 28. Mineral particles 30 are filled between the inner wall 28 and the outer wall 26. The inner wall 28 and the outer wall 26 have a plurality of holes 32 so that water can flow through the holes 32. The mineral particles 30 include coral calcium and mineral stone. Bamboo charcoal particles 34 are also filled between the inner wall 28 and the outer wall 26, and mixed with the mineral particles 30. The inner wall 28 has a circular shape, and the outer wall 26 has a shape of an octagon.

The rotation of the magnetic agitator 14 magnetizes water that flows around the magnetic agitator 14, and induces a turbulent flow of water in a space between the magnetic agitator 14 and inner wall 28 of the additive container 16. Due to the turbulent flow, water flows into the holes 32 of the inner wall 28, flows around the mineral particles 30 and the bamboo charcoal particles 34, and flows out of the holes 32 of the outer wall 26. Minerals are dissolved into water from the mineral particles 30, and the bamboo charcoal particles 34 purify water during this water flow. This magnetization and addition of minerals, etc. treat water into a form that has a variety of beneficial effects for human health.

Figure 9:
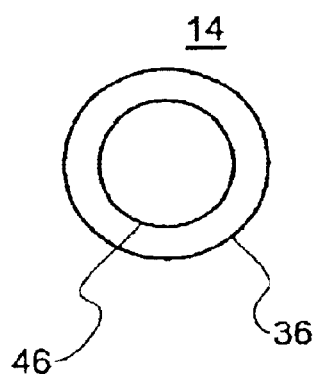
FIG. 9 is a bottom view of the magnetic agitator.

FIGS. 7–9 show the magnetic agitator 14. The magnetic agitator 14 has a base 36 and a fin 38 that protrudes upward from the base 36 an agitator magnetic bar 40 between the fin 38 and the base 36. The agitator magnetic bar 40 is a permanent magnet having magnetic field strength of 5500 gauss. The fin 38 has a shape of "Y" or of a horseshoe. This shape of the fin 38 induces stronger turbulent flow and enhances magnetization and mineral addition effects.

The base 36 of the magnetic agitator 14 is positioned on the bottom plate 22 of the additive container 16. The base 36, and hence the magnetic agitator is rotated by the agitator driver 20.

The base 36 has a shape of a disc having an upper surface 42 and a lower surface 44. The lower surface 44 is convex. An agitator metal plate 46 is attached to the lower surface 44 and covers part of the lower surface. Preferably, the agitator metal plate 46 covers about two-thirds of the area of the lower surface 44.

Referring back to FIGS. 5 and 6, the bottom plate 22 of the additive container 16 has a bottom metal plate 48 attached to the bottom plate 22.

Figure 10:
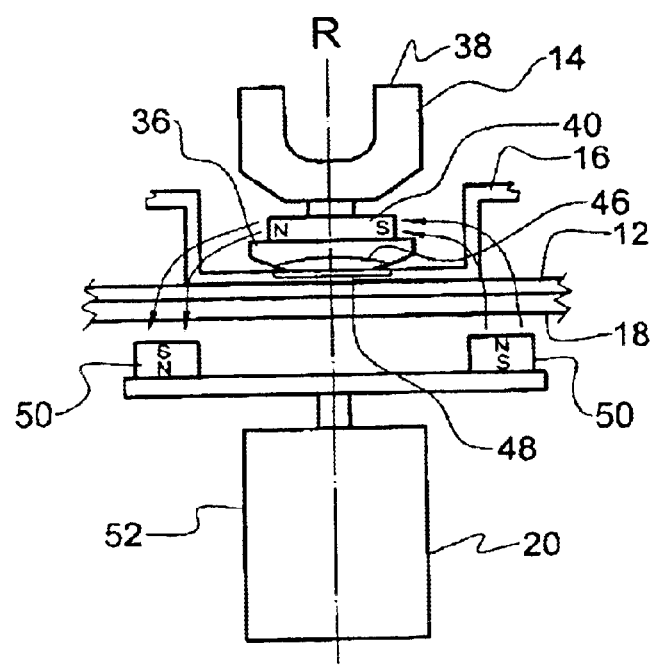
FIG. 10 is a schematic view showing how an agitator driver rotates the magnetic agitator.

FIG. 10 shows how the agitator driver 20 rotates the magnetic agitator 14. The agitator metal plate 46 contacts the bottom metal plate 48. The metal plate 46 and the bottom metal plate 48 have the hardness required to prevent wear that might be caused by rotation of the magnetic agitator 14. The agitator metal plate 46 and the bottom metal plate 48 are made of stainless steel. The agitator metal plate 46 is pressed to conform to the convex lower surface 44 of the magnetic agitator 14.

The agitator driver 20 has two driver magnets 50, and a motor 52 for rotating the driver magnets 50 (Refer also to FIG. 3) about an axis of rotation R. Each of the driver magnets 50 has magnetic field strength of about 3500 gauss. The driver magnets 50 are positioned opposite about the axis of rotation R.

The driver magnets 50 and the agitator magnetic bar 40 are arranged so that the north pole of one of the two driver magnets 50 faces the south pole of the agitator magnetic bar 40, and the south pole of the other of the two driver magnets 50 faces the north pole of the agitator magnetic bar 40. In this way, when the driver magnets 50 are rotated by the motor 52, the magnetic field operating between the driver magnets 50 and the agitator magnetic bar 40 make the agitator magnetic bar 40 follow the rotation of the driver magnets 50, thereby rotating the whole magnetic agitator 14.

Figure 11:
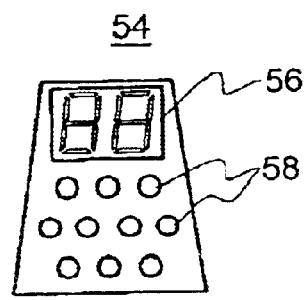
FIG. 11 is an elevation view of a display.
Figure 12:
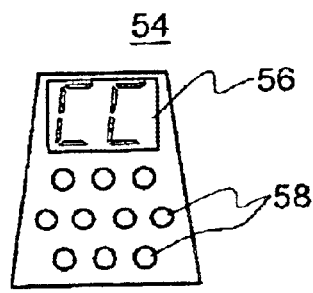
FIG. 12 shows that the display indicates a change reminder.

FIGS. 11 and 12 show a display 54 for the water-treating device. The display 54 includes a two-digit LED 56 and a plurality of circular LEDs 58. The display 54 shows a change reminder for replacing the additive container 16. Since minerals are dissolved into water when water flows through the additive container 16, the additive container 16 should be replaced periodically. The display 54 is programmed to display "CC" by the two-digit LED 56 per six months. "CC" represents "change cube." The additive container 16 is commonly called as "cube". The circular LEDs 58 are programmed to blink to a predetermined pattern when the magnetic agitator 14 is rotated.

Referring back to FIG. 3, a sound signal generator 60 is provided inside the pedestal 18. The sound signal generator 60 generates an audible alarm for replacing the additive container 16. The sound signal generator 60 also generates pleasant sound when the magnetic agitator 14 is rotated.

Figure 13:
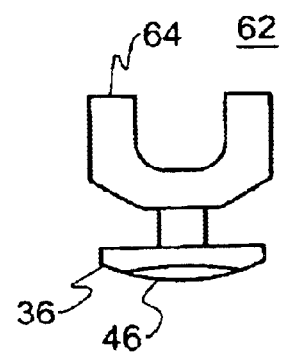
FIG. 13 is a plan view of an alternative magnetic agitator.

FIG. 13 shows an alternative magnetic agitator 62. The magnetic agitator 62 is different from the magnetic agitator 14 in that it has a fin 64 that is a permanent magnet. The fin 64 protrudes upward from the base 36.

By the above construction, a water-treating device having enhanced magnetization and mineral addition effects is provided. The Y-shaped fin of the magnetic agitator and rotation mechanism with given arrangement and strength generates stronger turbulent flow of water. Also, the durability of the magnetic agitator is secured by the metal plate provided under the base of the magnetic agitator.

Although the invention has been described in considerable detail, other versions are possible by converting the aforementioned construction. Therefore, the scope of the invention shall not be limited by the specification specified above.

What is claimed is:

1. A water-treating device comprising:
   a) a water jar;
   b) a magnetic agitator;
   c) an additive container having a bottom plate and a sleeve attached to the bottom plate;
   d) an agitator driver that rotates the magnetic agitator;

wherein the additive container is positioned inside the water jar and the magnetic agitator is positioned inside the additive container, wherein the sleeve of the additive container has an outer wall and an inner wall, wherein the additive container further comprises mineral particles that are filled between the inner wall and the outer wall, wherein the inner wall and the outer wall have a plurality of holes so that water can flow through the holes, wherein the magnetic agitator has a base and a fin that protrudes upward from the base, wherein the base is positioned on the bottom plate, and rotated by the agitator driver, wherein the base has a shape of a disc having an upper surface and a lower surface, wherein the lower surface is convex, and wherein an agitator metal plate is attached to the lower surface and covers part of the lower surface.

2. The water-treating device of claim 1, wherein the fin is Y-shaped.

3. The water-treating device of claim 2, wherein the fin of the magnetic agitator is a permanent magnet.

4. The water-treating device of claim 3, wherein the base of the magnetic agitator has a shape of a disc having an upper surface and a lower surface, wherein the lower surface is convex, wherein an agitator metal plate is attached to the lower surface and covers part of the lower surface.

5. The water-treating device of claim 4, wherein the bottom plate has a bottom metal plate attached to the bottom plate, and wherein the agitator metal plate contacts the bottom metal plate.

6. The water-treating device of claim 5, wherein the agitator driver has two driver magnets that are positioned opposite about an axis of rotation.

7. The water-treating device of claim 6, further comprising a display and a sound signal generator.

8. The water-treating device of claim 2, wherein the magnetic agitator further comprises an agitator magnetic bar between the fin and the base, and wherein the agitator magnetic bar is a permanent magnet.

9. The water-treating device of claim 8, wherein the agitator metal plate covers about two-thirds of the area of the lower surface.

10. The water-treating device of claim 8, wherein the bottom plate has a bottom metal plate attached to the bottom plate, and wherein the agitator metal plate contacts the bottom metal plate.

11. The water-treating device of claim 8, wherein the agitator driver has one or more driver magnets, and a motor for rotating the driver magnets about an axis of rotation.

12. The water-treating device of claim 11, wherein the agitator driver has two driver magnets that are positioned opposite about the axis of rotation.

13. The water-treating device of claim 12, wherein the agitator magnetic bar has magnetic field strength of about 5500 gauss, and each of the driver magnets has magnetic field strength of about 3500 gauss.

14. The water-treating device of claim 12, wherein the driver magnets and the agitator magnetic bar are arranged so that the north pole of one of the two driver magnets faces the south pole of the agitator magnetic bar, and the south pole of the other of the two driver magnets faces the north pole of the agitator magnetic bar.

15. The water-treating device of claim 14, wherein the mineral particles comprise coral calcium and mineral stone.

16. The water-treating device of claim 14 wherein the inner wall has a circular shape, and the outer wall has a shape of an octagon.

17. The water-treating device of claim 14, wherein the additive container further comprises bamboo charcoal particles that are filled between the inner wall and the outer wall.

18. The water-treating device of claim 14, further comprising a display and a sound signal generator.

19. The water-treating device of claim 18, wherein the display shows a change reminder for replacing the additive container.

20. The water-treating device of claim 19, wherein the sound signal generator generates an audible alarm for replacing the additive container.

* * * * *